March 31, 1970 J. L. WALLACE, JR 3,504,132

MEMORY UNIT FOR REPERTORY DIALLER UTILIZING CODED ENCAPSULATED RESISTORS

Filed May 14, 1965

INVENTOR

J. LIGHTSEY WALLACE, JR.

BY Tipton D. Jennings

ATTORNEY

United States Patent Office 3,504,132
Patented Mar. 31, 1970

3,504,132

MEMORY UNIT FOR REPERTORY DIALLER UTILIZING CODED ENCAPSULATED RESISTORS

Jacob L. Wallace, Jr., Springfield, Va., assignor to The Susquehanna Corporation, a corporation of Delaware Filed May 14, 1965, Ser. No. 455,724
Int. Cl. H04m 1/26
U.S. Cl. 179—90 4 Claims

ABSTRACT OF THE DISCLOSURE

In an illustrative embodiment of the memory unit, an encoded printed circuit board provides the memory for a repertory dialler. The printed circuit board has several rows, each of which contains an encoded telephone number formed by a series of code elements. Each code element has a number formed on its top so that this number is displayed when the code element is plugged into the board. In this manner the encoded telephone numbers can be quickly ascertained by reading each row of numerals. Each code element contains an encapsulated resistor having a discrete resistance value which value is weighted according to the numeral on the code element.

This invention relates to a memory unit which is easily programmed, to the method of programming the memory and to the code elements used in programming the memory.

In copending patent application Ser. No. 370,780, filed May 28, 1964, by J. Lightsey Wallace, Jr., now U.S. Patent 3,341,666, there is described a novel repertory dialing apparatus which is used to automatically dial, upon selection, telephone numbers stored in the repertory. In FIGURE 4 of said application, there is shown a memory card which is capable of being programmed to any desired telephone number by inserting wires into appropriate sockets in the card. This procedure connects resistors, incorporated on the memory card and weighted according to their digit value, in circuit with a comparator which controls during operation of the repertory dialer the number of generated dial pulses.

In the memory card of the present invention there is eliminated the costly and time-consuming requirement of incorporating resistors and also other electrical components onto the memory card during manufacture. Furthermore, the requirement of providing a supply of wires and, during programming, locating the sockets and connecting the wires therebetween are also eliminated. Accordingly, an object of the present invention is to provide an improved memory unit which is easily programmed and whose program can readily be altered or varied as desired. Another object is to provide an improved method of programming a memory.

Also in the memory board of the aforementioned application, it is difficult to ascertain immediately upon inspection the telephone numbers coded into the memory. It requires to some extent the tracing of wires between sockets and the determination of the digit values or numbers for the sockets. In the present invention the coded telephone numbers can be immediately and easily read and, therefore, it is a further object of the invention to provide a memory unit from which the information coded therein can be directly read visually in linear sequence as corresponding numerals.

Still another object is to provide multiple sets of coded information on a single memory unit.

A still further object of this invention is to provide unique code elements which lead themselves to rapid and efficient use while programming and essentially eliminate the likelihood of error in such programming.

Other objects and advantages will become apparent by a reading of the specification in conjunction with the drawings in which.

Figures 1, 2, 3, 4, 5, 6, 8:
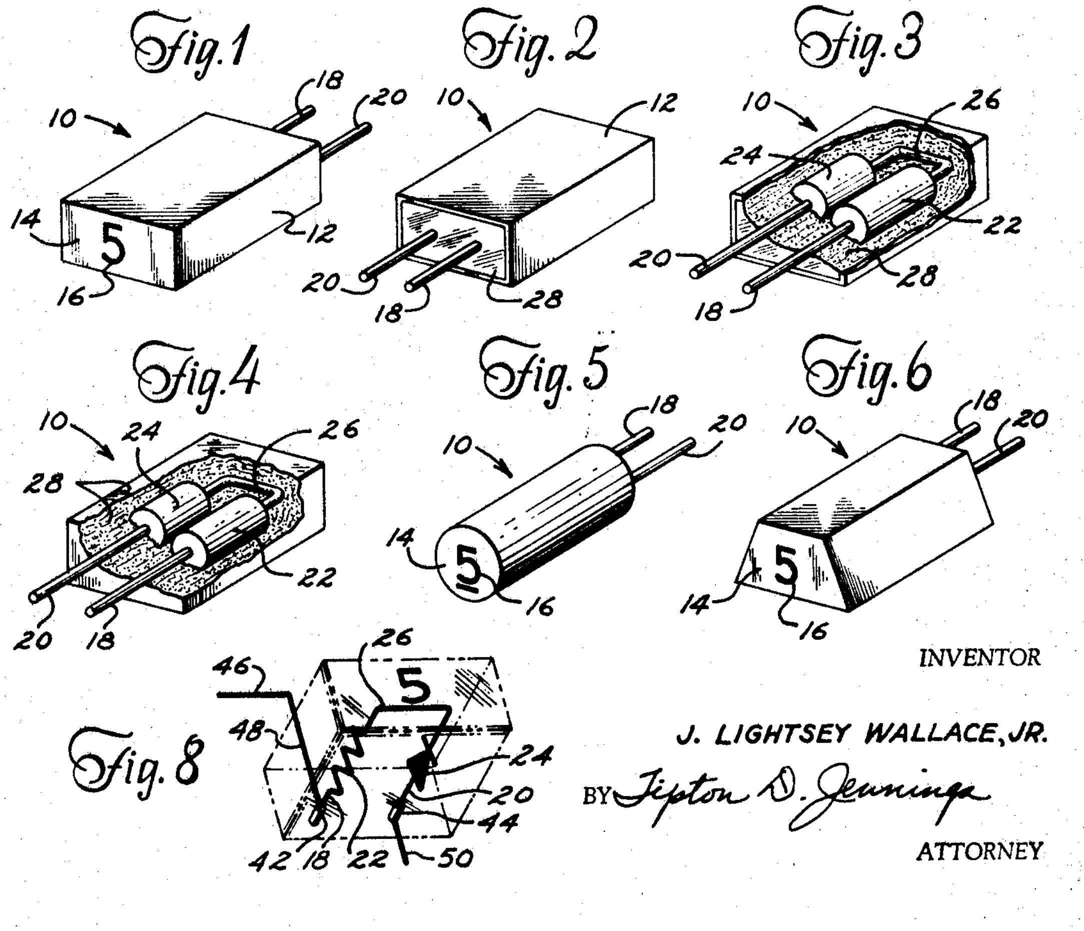
FIGURES 1 through 6 show construction details of various embodiments of the code elements.
FIGURE 8 shows a schematic representation of a code element inserted into sockets on the memory board.

Various constructions of the code elements which are used to program the memory are shown in FIGURES 1 through 6. In FIGURES 1 through 4 the code element 10 is shown as being rectangular in cross-section while other cross-sectional shapes are depicted in FIGURES 5 and 6. The code element 10, illustrated in FIGURES 1 through 3, has an outer shell of thin plastic on the side walls 12 and on the front end or top 14. A symbol, such as the Arabic numeral 16, is printed, impressed or otherwise marked on the top 14. At the rear end two wires 18, 20 extend outwardly and form the pins which are used to connect the code element 10 into a memory board, as later described.

Positioned within the code element 10 is a resistor 22 and diode 24 which are electrically connected at their upper ends by lead 26. Wires 18 and 20 are connected to the lower ends, respectively, of resistor 22 and diode 24 to provide an electrical series circuit within the code element. A heat-resistant synthetic resin 28, such as an epoxy potting material, is used to retain the resistor and the diode within the element and further serves to seal the rear end of the code element 10.

FIGURE 4 shows a second construction of the code element 10 which has proven to be the preferred form. Here the plastic outer shell is eliminated and the resistor 22, diode 24, wire 26 and the upper part of wires 18 and 20 are sealed within a nonconducting, molded block or body of synthetic resin 28. The resin can be either a thermosetting or thermoplastic type which will withstand the highest expected operating temperature. An example of this resin is polyvinyl chloride. The wires 18 and 20 extend from the rear end of the code element as previously described. The top 14 is again marked with an Arabic numeral 16.

FIGURES 5 and 6 show alternative configurations for the code element. In FIGURE 5 the code element is circular in cross-section while in FIGURE 6 the cross-section forms a trapezoid. This trapezoidal shape is helpful in positioning the code element correctly when inserting it into a memory board. For example, by instructing that the larger base of every trapezoidal code element is always oriented the same way, the chance of error occurring during the programming operation is reduced.

The Arabic numeral 16 visibly displayed on the top 14 of code element 10, such as the single, whole number or digit "5" shown in the figures just described, has a direct relationship with the value of the resistor 22 within the code element. For ten code elements numbered with the digits one through zero (ten), there will be ten different discrete values of resistance for resistor 22. For example, the resistor in all code elements having the digit "1" on top can have a value of 1,000 ohms; the resistor in the code elements having the digit "2" on top can have a resistance of 2,000 ohms; for code elements numbered "3" a value of 3,000 ohms; and so forth in 1,000 ohm steps per digit up to 10,000 ohms for the resistor in the code elements having the digit "0" (ten). Through this relationship of resistance value and digit value, it is seen that resistance value is weighted in relationship to the numbers marked on the code elements.

Figure 7:
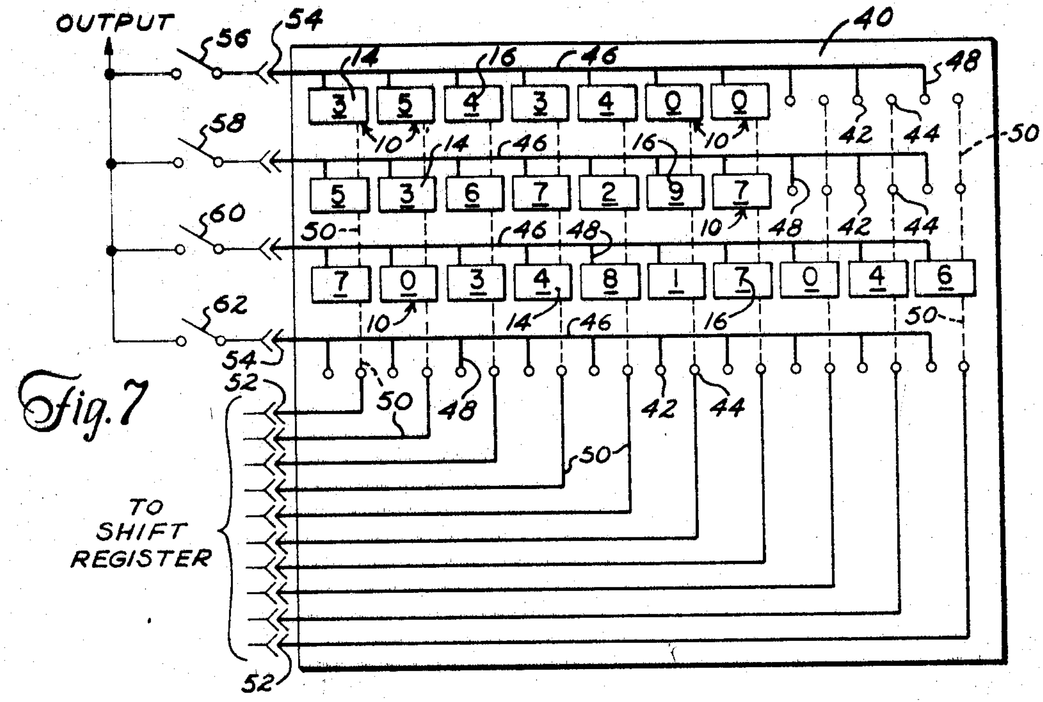
FIGURE 7 shows the construction of a memory board which has been programmed by the use of code elements.

In FIGURE 7 there is shown a printed circuit plug-in board 40 having four rows of sockets 42, 44 formed in pairs, three rows programmed with the code elements 10. The coded information formed by the code elements is telephone numbers or addresses and in that respect the board is similar to the broads shown in FIGURE 4 of patent application Ser. No. 370,780. In that application the address boards are each shown containing a single address, each board capable of being individually selected. When a board is selected, the coded address on that board is brought in circuit between a shift register, which sequentially scans or reads by grounding the digit positions of the address, and a comparison circuit which uses the resistance of the coded address to control the dialing. In FIGURE 7 of the present application the board 40, by example, is shown in this same environment whereby a selected coded telephone number is connected between a shift register (not shown) and an output line which leads to a comparison circuit (not shown).

On the board 40, four printed circuit lines 46 extend horizontally across the board, each line serving one row of sockets. In each row the line 46 is connected to the left socket 42 in each socket pair by a line 48 which extends downwardly and makes contact with the socket 42. Board 40 is printed on both sides and on the underside of this board, represented in dotted-line form, are ten vertical lines 50. These ten vertical lines 50 make contact with right-hand sockets 44, which extend through the thickness of the board, to form ten columns of sockets 44. The right-hand sockets 44 connected by each vertical line 50 have the same corresponding position in their respective address row. The ten vertical lines 50 extend from the right-hand sockets 44 of the lowermost address rows to the ten contacts 52 depicted schematically by arrows at the lower left side of the board. To the left of these contacts 52 is shown a mating socket which leads to a shift register (not shown) mentioned previously.

The printed circuit lines 46 terminates on the left of the board at four contacts 54 also schematically represented by arrows. These contacts 54 mate with a socket leading to four contacts 56, 58, 60, 62. These four contacts are by example the contacts of four relays such as those shown in FIGURE 4 of the aforementioned application Ser. No. 370,780. These four contacts are designed to be individually selectable to connect a line 46 and its coded address to the output. For example, if contact 58 is closed, the coded address 536–7297 is connected to the output. In operation, as the shift register grounds in sequence each line 50, the code elements shown in this address would sequentially be brought into the logic of the system. The remaining addresses are out of the logic because the contact connected to their horizontal line 46 is not closed.

FIGURE 8 shows an electrical schematic of a code element 10 inserted into board 40. The resistor 22 in the code element 10 is connected by pin 18 and socket 42 to lines 48 and 46 and to diode 24 by line 26. The diode 24 is connected by pin 20 and socket 44 to line 50. Assuming that the schematic of FIGURE 8 corresponds to the first code element having the Arabic numeral "5" in the second address on board 40, and further assuming as before that contact 58 is closed, then when ground is applied by the shift register to the uppermost contact 52, its line 50 is grounded and diode 24 becomes forward-biased. Resistor 22 is then connected between ground and a source of negative potential (not shown) in the output circuit. Because only contact 58 is closed the ground path appearing on the left-most line 50 will have no effect on the first code element 10 in the other addresses.

By using the aforedescribed code elements 10 the programming procedure is as follows. Assume that it is desired to program the address 703–481–7046 shown in the third row of selector board 40. Note that this address contains both the area code for long-distance dialing as well as the local exchange number. The programmer will have a supply of code elements numbered "1" through "0" which he can individually select. A code element having the numeral "7" is selected and inserted in the first pair of sockets 42, 44 on the third row. This code element is inserted as shown with the numeral 7 upright insuring that the resistor 22 and diode 24 are oriented as shown in FIGURE 8. A code element having the digit "0" is inserted into the second socket pair on the third row. A code element "3" is inserted next, followed by a code element "4." Then a code element having the numeral "8" is inserted and this procedure continues until the entire telephone number is programmed. When the printed circuit board is plugged into its mating connector and contact 60 is closed, the address in the third row will be read out as described in the aforementioned patent application, Ser. No. 370,780.

The code elements 10 are constructed so that they display their Arabic numerals 16 when mounted. When a telephone number has been coded into the memory by selectively combining into a row on the board 40 the desired code element 10, a unique memory results. Not only does the coded memory permit electrical readout by the system in which it is used, but also permits a programmer or other person to ascertain quickly the stored telephone numbers by merely reading the row of numerals visually in a linear sequence.

Note that in FIGURE 7 the numerals on the code element are underlined to assist in orienting them during programming. The programmer is able to ascertain what is the upright position to ensure that the resistors and diode are inserted as shown in FIGURE 8. As an alternative, the code element configuration shown in FIGURE 6 could be used with the instruction that the larger base of the trapezoid is always on the bottom. If desired, a special configuration of pins 18 and 20 and sockets 42 and 44, or special keying means could be used to ensure that the code elements 10 are always inserted with the proper orientation. The code elements 10 are, of course, interchangeable, and to reprogram or otherwise alter the memory of board 40, it is a simple matter to unplug the code elements and insert the code elements desired in the new addresses.

It is apparent that various modifications may be made by one skilled in the art without departing from the spirit and scope of the present invention. For example, Roman numerals or other number symbols can be substituted for the Arabic numerals, or the diodes 24 can be located on the board 40 rather than in the code elements. Furthermore, it is readily seen that in view of the teachings of this invention, electrical elements having parameters other than resistance can be used in code elements for programming a memory. Such electrical elements can be capacitors or inductors, by example. Therefore, it is desired that only such limitations be placed on this invention as are imposed by the prior art and set forth in the appended claims.

What is claimed is:

1. A series of interchangeable code elements for use in a memory of telephone addresses, each element comprising a nonconductive body, an electrical circuit formed within said body, said circuit having a discrete value of resistance, connector means formed externally of said body and in electrical contact with said circuit, and a single, legible numeral incorporated onto said body, the discrete value of resistance of each circuit in each element being related to the numeral on the body of the element in such manner that code elements having the same numeral have the same value of resistance and code elements having different numerals have a different value of resistance, said code elements being capable of being selectively combined to make a memory of telephone addresses, each of said telephone addresses being readable by virtue of the numerals being visibly displayed.

2. A series of interchangeable code elements for use in the memory of a repertory dialer, each element comprising a molded, plastic body, a resistor embedded within said body, a pair of electrical connector pins extending from said body, said resistor being electrically connected between said pins, and a single Arabic numeral marked on said plastic body, said Arabic numeral being one of ten digits, and each resistor having a discrete resitance value, said value being related to the Arabic numeral marked on the body of the code element such that each resistor in code elements having the same digit has the same value of resistance and each resistor in code elements having difference digits has a different value of resistance, said code elements capable of being selectively combined to make a memory of coded telephone addresses each of said telephone addresses being readable by virtue of the Arabic numerals being visibly displayed.

3. A memory unit of coded telephone addresses which are capable of being read visually in corresponding numerical form, comprising a printed-circuit board having at least one row of sockets, said sockets being electrically connected, a plurality of code elements, each of said code elements having connector means for mating with said sockets to mount said code elements and form at least one row of coded information, each of said code elements comprising an electrical circuit having a resistance of a discrete known value, a single legible numeral incorporated on each code element and being visible when said code element is mounted on said board, the discrete value of resistance of each code element being weighted in relation to the numeral on that code element, and a row of code elements, by virtue of the numerals visibly displayed, presenting in readable sequence a telephone address.

4. A memory unit for storing telephone addresses in a repertory dialer comprising a printed-circuit card having a first plurality of separate printed-circuit lines, a plurality of rows of socket pairs, each socket pair in each row corresponding in position with socket pairs in the other rows, each row of socket pairs being associated with a separate one of said first printed-circuit lines wherein one socket in each of the socket pairs in the same row is connected to its associated printed-circuit line, a second plurality of separate printed-circuit lines separate from said first lines, the corresponding socket pairs in each row being associated with one of said separate second printed-circuit lines wherein the other socket in each corresponding socket pair is connected to its associated line, a plurality of code elements mounted on said card, each of said code elements having a pair of depending pins which mate with a socket pair when said code elements are mounted, said code elements being mounted in the rows of socket pairs to form separate coded telephone addresses, each of said code elements comprising at least a resistor connected in circuit with said pins, and having an Arabic numeral visible when said code element is mounted on said card, each resistor in each code element having a discrete value based upon the Arabic numeral on the code element, and each row of code elements by virtue of the Arabic numerals visibly presenting in sequence the telephone address coded on that row.

References Cited

UNITED STATES PATENTS

| | | | |
|---|---|---|---|
| 2,391,038 | 12—1945 | Rifenbergh | 174—52.6 |
| 3,161,859 | 12/1964 | Medwin | 340—173 |
| 3,222,451 | 12/1965 | Lee et al. | 174—52.6 |
| 3,264,248 | 8/1966 | Lee | 174—52.6 |
| 2,430,457 | 11/1947 | Dimond | 179—90 |

OTHER REFERENCES

Heathkit Calalog 81/30, Fall and Winter—1963, p. 97, copyright 1962, TK 6550, H37, Feb. 11, 1963.

Heathkit® Assembly Manual, Educational Electronic Analog Computer, Heath Company Publication 595-234, Copyright 1960, call No. TK 6550 H37, pp. 1, 6, 34.

KATHLEEN H. CLAFFY, Primary Examiner

A. B. KIMBALL, Jr., Assistant Examiner

U.S. Cl. X.R.

174—52; 338—227; 340—173